United States Patent [19]

Dell

[11] 3,764,719
[45] Oct. 9, 1973

[54] DIGITAL RADAR SIMULATION SYSTEM
[75] Inventor: Darold R. Dell, Palo Alto, Calif.
[73] Assignee: Precision Instrument Company, Palo Alto, Calif.
[22] Filed: Sept. 1, 1971
[21] Appl. No.: 176,893

[52] U.S. Cl. ............................................. 35/10.4
[51] Int. Cl. ............................................. G09b 9/00
[58] Field of Search ................................ 35/10.4

[56] References Cited
UNITED STATES PATENTS
3,446,903  5/1969  Beizer ............................ 35/10.4
3,514,521  5/1970  Burchard et al. ................ 35/10.4
3,571,479  3/1971  Horattas et al. ................. 35/10.4

Primary Examiner—T. H. Tubbesing
Attorney—Donald J. DeGeller

[57] ABSTRACT

A digital radar simulation system having a main memory in which data words representative of the elevation and reflectance of discrete locations in a geographic area are stored in cartesian coordinate format. The main memory is continuously sampled to retrieve the data words of locations coming into the radar field of view of a simulated aircraft overflying the geographical area, which data words are placed in a field of view memory in cartesian coordinate format. Signals representative of the speed and heading of the simulated aircraft are used to control the selection of new data words so as to continuously update the field of view memory, so that the field of view memory will at all times contain the data words corresponding to the locations within the simulated aircraft field of view. The data words in the field of view memory are accessed out in a polar coordinate arrangement in the form of successive, discretely spaced radial scan lines and in the order of increasing range for each scan line with the origin of the polar coordinate system coinciding with the position of the simulated aircraft. The data words thus accessed from the field of view memory are suitably processed to produce a radar-like display on a cathode ray tube screen.

17 Claims, 12 Drawing Figures

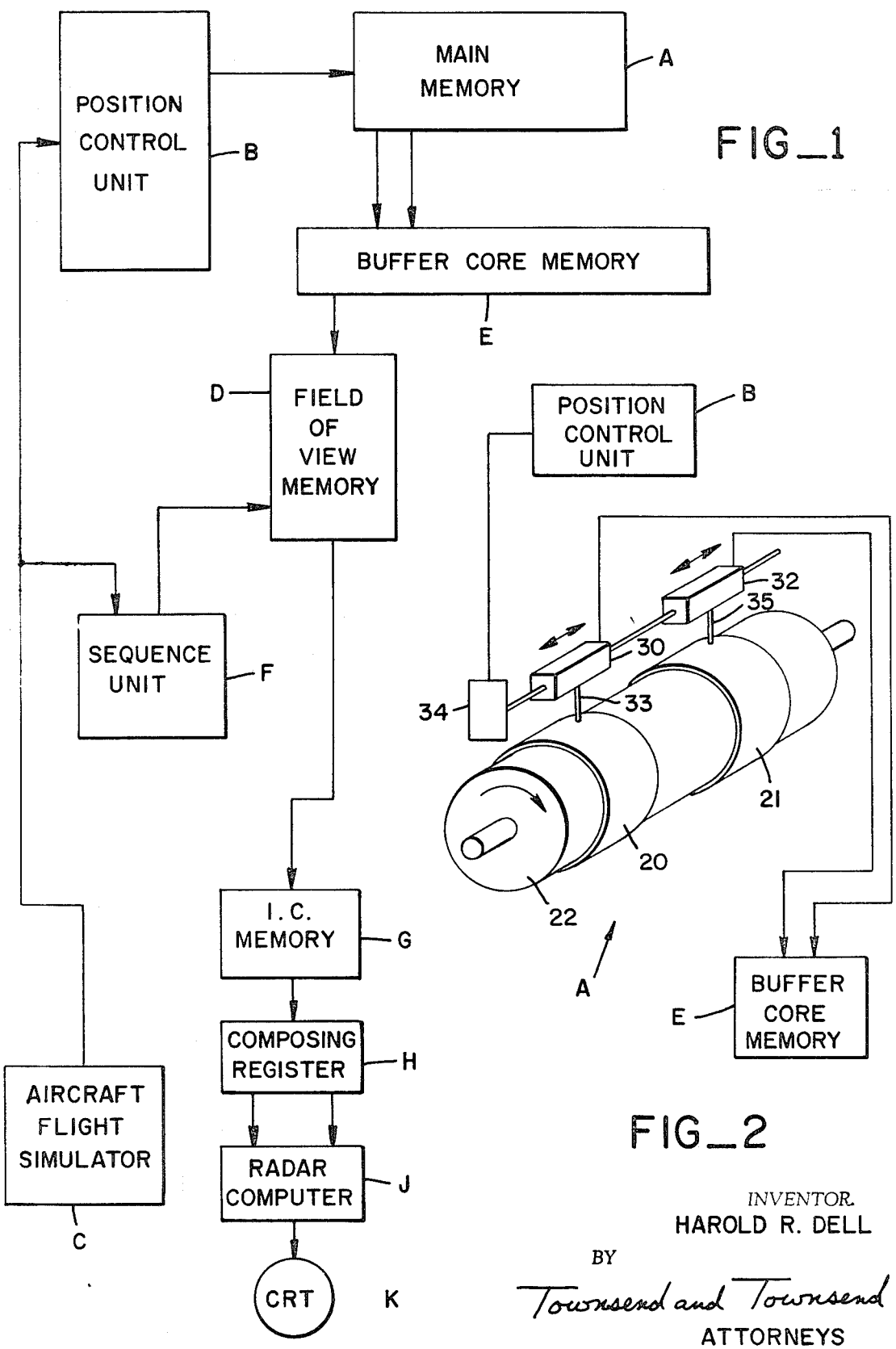
FIG_1
FIG_2

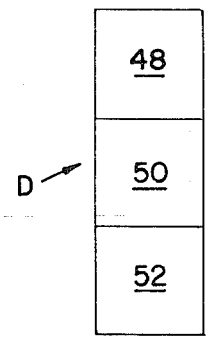
FIG_3
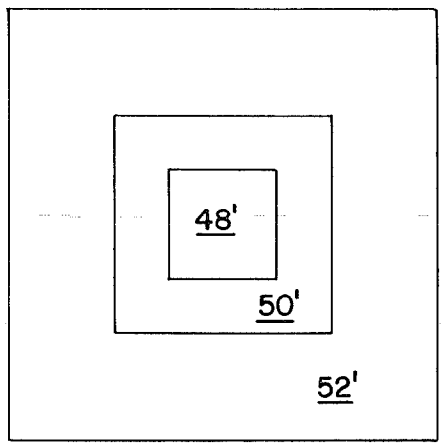
FIG_4
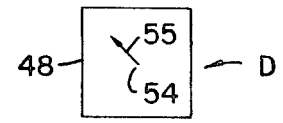
FIG_5a
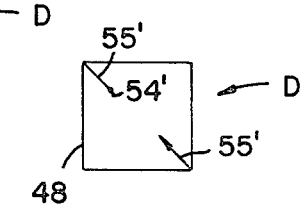
FIG_5b
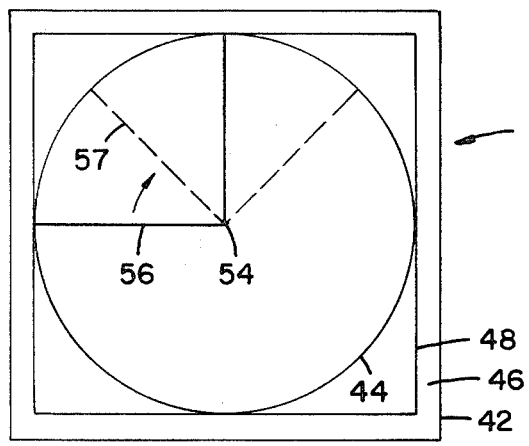
FIG_6
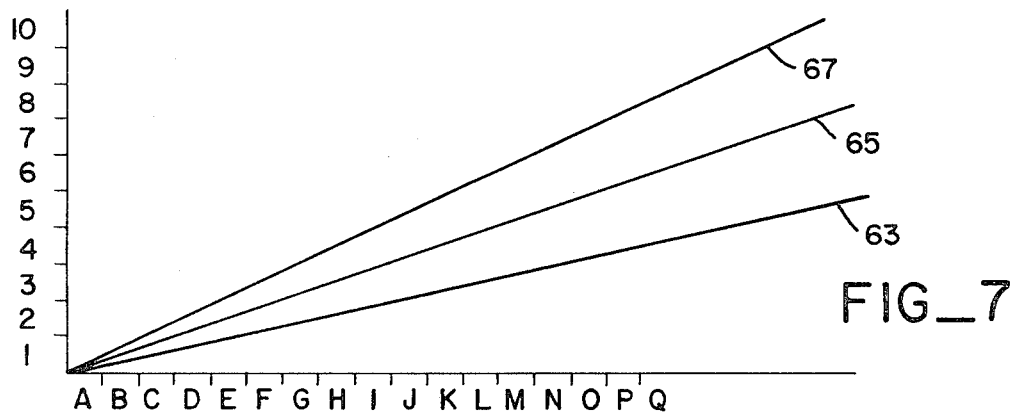
63a — 1A 1B 1C 2D 2E 2F 3G 3H 3I 4J 4K 4L 5M 5N 5O 6P 6Q
65a — 1A 1B 2C 2D 3E 3F 3G 4H 4I 5J 5K 6L 6M 6N 7O 7P 8Q
67a — 1A 2B 2C 3D 3E 4F 4G 5H 5I 6J 6K 7L 8M 8N 9O 9P 10Q
FIG_8

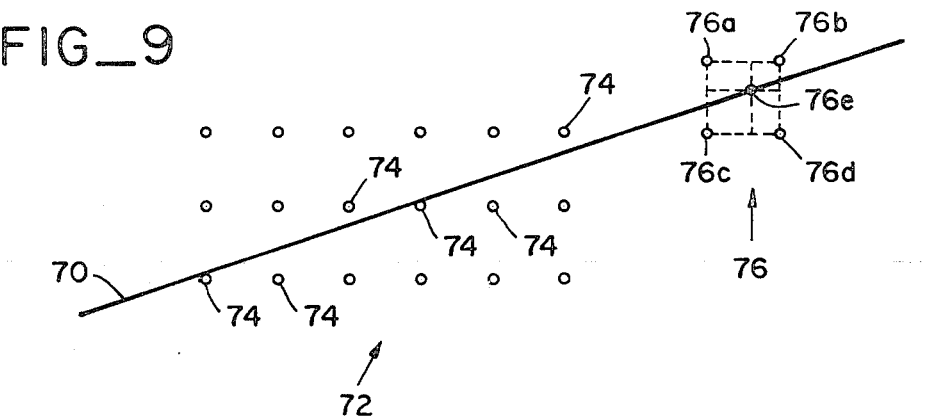
FIG_9
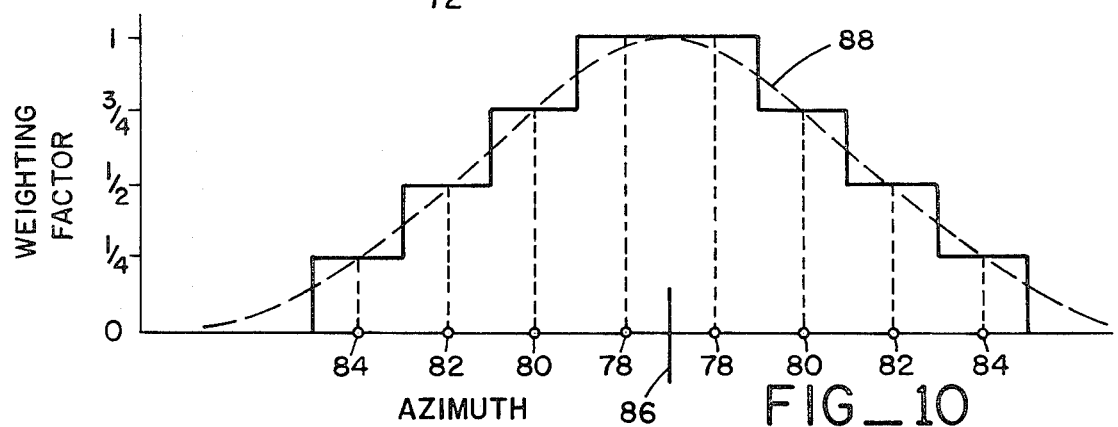
FIG_10
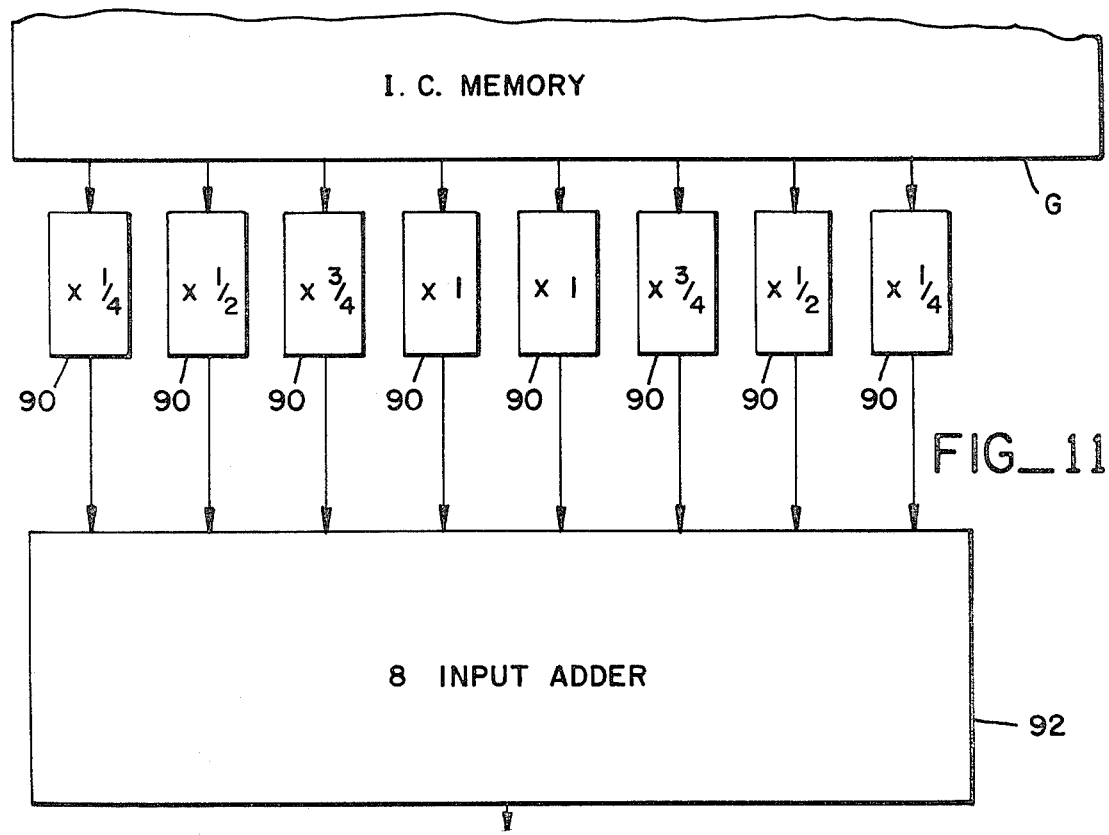
FIG_11

DIGITAL RADAR SIMULATION SYSTEM

SPECIFICATION

This application incorporates by reference the subject matter disclosed and claimed in the following commonly owned, copending patent applications:

Ser. No. 831,172 for LASER RECORDING MEDIUM, filed June 6, 1969; issued May 23, 1972, as U.S. Pat. No. 3,665,483; Ser. No. 807,551 for HIGH DENSITY PERMANENT DATA STORAGE AND RETRIEVAL SYSTEM, filed Mar. 17, 1969; issued on Jan. 25, 1972, as U.S. Pat. No. 3,638,185; Ser. No. 807,553 for LASER RECORDING UNIT, filed Mar. 17, 1969; issued on Apr. 4, 1972; as U.S. Pat. No. 3,654,624; Ser. No. 807,548 for LASER RECORDING SYSTEM, filed Mar. 17, 1969; issued on Apr. 18, 1972, as U.S. Pat. No. 3,657,707.

This invention relates to a digital radar simulation system.

The display of radar images of a geographic area overflown by an aircraft is extensively utilized in training future pilots and navigators. In the past, the trainees overflew a given area and directly observed the radar display on screens mounted in the aircraft. This training method is expensive since it requires the operation and maintenance of costly aircraft. Moreover, the training is dependent upon, and often hampered by, weather conditions and is limited to geographic territories within the national boundaries or, at the most, within the boundaries of politically friendly nations.

To overcome the above-enumerated shortcomings, attempts have been made to provide radar simulation systems in which geographical data is stored in a compressed form and retrieved in accordance with the flight direction and speed of a simulated aircraft passing over the geographical area. In this manner a plurality of trainees can simultaneously observe radar simulation on screens displaying radar images similar to those observed on radar screens in an aircraft in actual overflight of the area. Substantial cost reductions can thereby be obtained.

Such systems generally employ photographic film plates for the radar reflectance and elevation of the overflown geographic area. A suitable sensing unit is moved over the plate in accordance with a given flight path and speed and provides signals that are processed for display on a radar screen.

Such conventional systems require very expensive plates that are tediously pieced together from photographic films of the geographic area. The assembled records are permanent. Changes in the geographic area, such as the construction of dams, buildings, roads, railways, power lines and the like, as well as changes from natural causes such as the weather, erosion, earthquakes and the like, are difficult or impossible to incorporate into an existing record. Instead, a new record must be prepared which, due to its high costs, is relatively unfeasible. As a consequence, up to date overflight radar simulation has heretofore been scarce or unavailable due to the great expense of updating the geographic area records.

It is thus an object of the present invention to provide a radar simulation system in which the geographic data stored therein may be easily, quickly and relatively inexpensively updated.

Another object of the present invention is to provide an on-ground radar simulation system for producing radar-like displays as would be viewed from an aircraft flying over the corresponding geographical area.

Yet another object of the present invention is to provide a radar simulation system in which the geographical data is stored and processed in digital form.

These objects are met according to the present invention by providing a digital radar simulation system having a high density, digitally-coded, main memory, such as an optic storage medium that is laser coded in accordance with the above referenced patent applications. Coded data words representative of the characteristics of equally spaced discrete locations or sub-areas within the geographical area are stored in the main memory, in cartesian coordinate format. The main memory is continuously sampled to retrieve the data words of sub-areas within the radar field of view of a simulated aircraft overflying the geographical area, which data words are placed in a field of view memory in cartesian coordinate format. Signals representative of the speed and heading of the simulated aircraft are used to control the selection of new data words so as to continuously update the field of view memory. Thus, the field of view memory at all times contains data words corresponding to the sub-areas within the simulated aircraft field of view. Sequencing means select those data words within a given sector of the field of view memory, which sector is centered about a line corresponding to the instantaneous relative direction of movement of the simulated aircraft over the geographic area. The sequencing means accesses these data words in a polar coordinate arrangement in the form of successive, discretely spaced radial scan lines and in the order of increasing range for each scan line with the origin of the polar coordinate system coinciding with the position of the simulated aircraft. The data words thus accessed from the field of view memory are suitably processed to produce a radar-like display on a cathode ray tube screen.

To more closely simulate the radar display obtained during actual overflight of a geographic area means are also provided to effect an image-blurring radar beam widening as would be experienced on long range radar displays.

It is thus apparent that the present invention provides a relatively low cost, versatile radar simulation system for simulating airborne radar surveyance of geographic areas. Since the updating of the main storage is relatively easy and inexpensive, it can be done frequently to not only simulate the actual overflight of a given geographic area, but to also familiarize the trainee with the geographic area. This is of particular importance in instances where it is not feasible to fly over the actual geographic area, as, for example, when the geographic area contains unfriendly or hostile nations.

These and other objects, features and advantages of the present invention will be more readily apparent from the following detailed description wherein reference is made to the accompanying drawings, in which:

FIG. 1 is a block diagram of the digital radar simulation system according to the present invention;

FIG. 2 is a diagrammatic perspective view of the main memory system according to the present invention;

FIG. 3 is a schematic representation of a plurality of fields of view of increasing range in the field of view memory;

FIG. 4 is a schematic representation of an alternative arrangement of a plurality of fields of view of increasing range in the field of view memory;

FIGS. 5a and 5b illustrate the manner in which data retrieved from the main memory is written into the field of view memory;

FIG. 6 illustrates the simulated radar field of view sector having its origin at the relative position of an imaginary object overflying the geographic area represented by the main memory;

FIGS. 7 and 8 illustrate graphonumerically the manner in which data words in the field of view memory are read out by the sequencing unit of the present invention in polar coordinates;

FIG. 9 is a graphic representation of a data region indicating the approximation error that occurs during the polar readout of the data in the field of view memory;

FIG. 10 graphically illustrates the beam widening function; and

FIG. 11 is a schematic diagram of the beam widening simulation circuitry.

GENERAL DESCRIPTION

Referring initially to FIG. 1, there is depicted a digital radar simulation system according to the present invention comprising a high density digitally coded main memory or storage A, such as an optic storage medium that is laser coded in accordance with the above-referenced patent applications. In the main memory A, coded signals indicating the average radar reflectance and elevation of discrete locations or sub-areas in the geographic area, such as squares having 250 ft. sides, are stored in the form of 12 bit binary data words. The discrete locations are arranged in a cartesian coordinate system which, preferably, has north-south and east-west axes.

In a preferred embodiment the main memory covers a geographic area of 1,250 by 1,250 nautical miles and, thus, has $9.1 \times 10^8$ data words and $1.1 \times 10^{10}$ data bits. This data volume is stored on perpendicular tracks and bits, with a two micron bit cell spacing and a six micron center-to-center track spacing. A film coded in accordance with the above-referenced patent applications enables the storage of this volume of data, suitable clocking identification and control signals, on a film strip having an overall size of only about 9 ½ inches × 31 ¼ inches including sufficient margins for the mounting of the strip. With such high density data storage it becomes relatively easy and inexpensive to retrieve data for subsequent display on a radar screen. A preferred embodiment of the present invention provides for the mounting of a pair of perpendicularly arranged record strips on a rotating drum which are scanned by optical read heads.

The data contained in the main memory A is sampled in accordance with control signals produced by a position control unit B, in response to input signals representative of the position, attitude and radar range of the simulated aircraft. In the main memory A, the read heads move perpendicular to the rotating record strips, according to the speed and heading of the simulated aircraft, in response to the position control unit B. The read heads sample those data words which come into the field of view of the simulated aircraft. The thus accessed data is placed in a field of view storage or memory D via a buffer core E.

The field of view memory D is continuously updated with new data supplied by the optical read heads by substituting data words corresponding to sub-areas that come into the field of view of the simulated aircraft, for data words corresponding to sub-areas leaving the field of view of the simulated aircraft. To permit the simulation of radar range switching, the field of view memory preferably comprises a plurality of field of view memory sections which represent various radar ranges. In a preferred embodiment of the invention, each memory section is of like capacity sufficient for storage of all data within the minimum, say 25 mile range of view of the aircraft. The remaining two field of view storage sections have the same capacity as the first section bur recorded therein are only every fourth and every sixteenth data word in main storage within the field of view of the simulated aircraft for radar ranges of 50 and 100 miles, respectively. The number and size of the ranges can of course be suitably varied and increased or decreased over the stated values.

The radar range switching is performed instantaneously by accessing the data in one of the three field of view memory sections. As the field of view range increases, the display resolution decreases since fewer data points are selected per unit area for increasing ranges.

To obtain a radar display of a polar scan, as occurs when an area is radar scanned, a sequencing means F is provided to access and transform the data in the field of view memory into a data output arranged along polar coordinates. The polar coordinates originate at the instantaneous relative position of the simulated aircraft over the geographic area and the selected data words correspond to the sub-areas in a sector centered about the instantaneous simulated aircraft heading. Accordingly, sequencing unit F is controlled by the position, altitude and range signal inputs referred to hereinbefore. Sequencing unit F selects the data words from the field of view memory which falls closest to each polar scan line in a sector of the field of view memory. In order to more realistically simulate a radar display, it is presently preferred to employ a 90° sector of the field of view memory to approximate a typical aircraft radar display.

The data signals accessed from the field of view memory D by the sequencing unit F are temporarily stored in an integrated circuit scan data memory or storage G in the order of successive scan lines, and increasing range for each line. The data contained in the scan data memory G is separated into elevation and radar reflectance components and loaded into composing registers H. The data is then digital-to-analog converted and smoothed into continuous analog functions for input into a radar equation computer J, or like equipment, and subsequently displayed on a cathode ray screen K.

STORAGE AND ACCESSING OF DATA FROM MAIN MEMORY A

As already briefly referred to it is preferred that the geographic area characteristics, namely the radar reflectance and elevation of a given geographic area, be recorded on an optically coded film in cartesian coordinate format. The manner of recording is described in detail in the above-referenced and incorporated co-pending patent applications. It is repeated herein only to the extent necessary to assure an understanding of this invention.

A given geographic area, say the above-referenced 1,250 × 1,250 nautical mile area, is divided into a predetermined number of square sub-areas or locations, say of a side length of 250' for a total number of $9.1 \times 10^8$ sub-areas in the geographic area. The sub-areas are aligned in the north-south and east-west directions and each sub-area is represented by a data word. Thus, the data words are arranged in perpendicular bits and tracks of a cartesian coordinate system, aligned in the north-south and east-west directions. Such large goegraphical recordation is particularly adapted for simulating the radar images obtained during long distance flgihts. A much smaller geographical area, with correspondingly reduced sub-areas can be recorded for the simulation of detailed, short-range images as would be employed for targeting or low-lever aircraft flights.

An average radar reflectance and elevation value is determined for each sub-area, for example, from land mass film plates, for each sub-area within the geographic area. Such plates are presently available for most parts of the world and are used an analog records of the territory's elevation and radar reflectance values. They are pieced together from individual photographs and are periodically updated to incorporate surface changes. Alternatively, digitized topographic maps, to the extent available, can be employed for determining these values for the sub-areas of the land mass.

The radar reflectance and elevation values are recorded on optically sensitive film strips by subjecting micron size strip areas to variable intensity laser rays. A 12 bit binary data word is recorded on a light sensitive strip defining the radar reflectance and elevation for each sub-area. The strip is readily reproducible and sections thereof can be altered by deleting the original binary data words for the affected sub-areas and replacing them with new data words which reflect changes in the surface characteristics of the particular sub-areas. A relatively frequent and low cost updating of the digital geographic record is thus possible.

Referring now to FIG. 2, a pair of optically coded record strips 20, 21, each having a multiplicity of data words arranged in perpendicular bits and tracks that extend over the width and the length, respectively, of the strips, are mounted on a rotating drum 22. Each data word comprises a 12 bit binary word representataive of the elevation and radar reflectance of the corresponding sub-area of the given geographic area. Additionally, the necessary clocking, timing and control bits are recorded on the strip and generally represent about 10 percent of the stored data volume. With the laser recording system disclosed in the above-referenced copending patent application the track center spacing is about 6 microns. The data bit spacing on a given track is about 2 microns to obtain a density of about 12,700 bits per linear track inch.

The two strips 20, 21 are identical, except that the data words on the two strips are perpendicular with respect to each other. Thus, the tracks on strip 20 are oriented in the north-south direction of the land mass while on strip 21 the tracks are oriented in the east-west direction. The stored information, however, is identical on both strips.

The strips are precisely positioned over the surface of a precision driven rotatable drum 22 with the help of known positioning devices and secured to the drum surface so that the tracks on both strips are parallel and precisely aligned with the direction of the rotational movement of the drum surface and the strip. The drum and the film strips are now rotated at a constant speed, such as 30 revolutions per second, and a pair of optical read heads 30, 32 are mounted over the drum surface for axial movement of the heads perpendicular to the orientation of the tracks on the strips across the strip width. Suitable mounting means, such as guide bars (not separately shown), permit the head movement, and transport means 34 is provided to move the heads independently of each other and at continuously variable speeds in an axial direction.

The read heads focus light beams 33 and 35 onto the portion of the record strips underlying the heads and sense the reflected light to thereby read the data stored on the strips in a manner more fully set forth in the above-referenced copending patent applications. Transport means 34 is actuated and controlled by position control unit B and translates the read heads across the width of strips 20, 21 in accordance with the speed and heading of simulated aircraft overflying the geographic area recorded on strips 20, 21. For example, if it is desired that the simulated aircraft fly with a given ground speed of say 750 feet per second in the north or south direction then read head 30 is moved at a speed of 3 tracks per second across the width of the north-south strip 20. Similarly, if it is desired that the simulated aircraft fly at the same speed in the east or west direction then read head 32 would move at a speed of 3 tracks per second across the width of the east-west strip 21. In the more common case in which the desired simulated aircraft heading is neither exactly north or south nor east or west, both read heads move simultaneously across the strip widths in accordance with the north-south and east-west speed components. The speed and direction of movement of the read heads is changed in accordance with desired changes in the speed heading of the simulated aircraft. As the read heads 30 and 32 translate back and forth across the strip widths, they continuously sample the binary data stored on the tracks that pass beneath light beams 33 and 35. The thus accessed data words within the field of view of the simulated aircraft are placed in a buffer core memory E where they are stored for further processing as described below.

Aircraft radar simulation of course requires a radar range switching capability. For example, in the preferred embodiment of the present invention it is contemplated to provide radar ranges of 25, 50 and 100 nautical miles. Since it is desirous to permit range switching at any time, the necessary data for all ranges must be continually accessed from the main memory A. Accordingly, read heads 30 and 32 are elongate in an axial direction and comprise three light reflection sensors which are spaced apart approximately 275 and 550 track widths, respectively, for 25, 50 and 100 mile radar ranges. The three reflection sensors are simultaneously moved by transport means 34 in accordance with the aircraft speed and heading. The signals thus generated by each reflection sensor are stored in the buffer core in the manner previously described.

ORGANIZATION OF THE FIELD OF VIEW MEMORY

Referring now to FIGS. 3 through 6, the data signals thus stored within buffer core E are placed in a field of view memory or storage D, which preferably comprises a magnetic drum memory. To permit the deisred instantaneous radar range switching capability, necessary data for all ranges must be continually entered and stored in field of view memory D. To this end, an organization of the field of view of memory D is schematically illustrated in FIG. 3. As is apparent from FIG. 3, the field of view memory D may preferably comprise a drum or disc having three sections 48, 50 and 52, arranged sequentially on the drum or disc. Sections 48, 50 and 52 respectively correspond to the data storage or the 25, 50 and 100 mile radar ranges. Since it is essentially valid to assume that the radar resolution decreases approximately as a square function of the range, sectiosn 48, 50 and 52 may be of equal size, and to simulate the reduced resolution, only selected data points may be entered into sectiosn 50 and 52.

In greater detail, memory section 48 for the 25-mile radar range should contain sufficient storage for all data words within a 25-mile range from the aircraft location, e.g., for $1,260^2$, or 1,580,600 data words, thus requiring $19.1 \times 10^6$ bits for 12 bit data word storage. While the 50-mile radar range contains four times as many data words as the 25-mile radar range, only every second data word of each second data track is written into the 50-mile memory section 50. Similarly, memory section 52, which encloses a 100-mile square, only records every fourth data word of every fourth data track, to again require an equal number of recorded data words. Preferably, field of view memory D comprises a disc or drum, head-on-every-track memory, so that all of the data contained therein may be readily accessed. For example, if the drum or disc is rotated at 60 revolutions per second, then, with a head-on-every-track, all of the data stored in field of view memory D is accessible 60 times per second.

Of course, the data storage in the memory sections for the closer radar ranges duplicates some of the data stored in the memory section for the greater radar range. Thus, an alternative organization of the field of view memory may be employed to further minimize the required capacity of field of view memory D. Such an organization is graphically illustrated in FIG. 4, in which memory section 48', corresponding to the data storage for the 25-mile radar range, is enclosed within memory section 50' corresponding to the 50-mile radar range. Similarly, memory section 50' is enclosed within memory section 52', corresponding to the 100-mile radar range. Accordingly, memory section 50' need not contain the data words corresponding to locations within the 25-mile radar range. Similarly, memory section 52' need not include data words within the 50-mile radar range. Thus, the requisite capacity of field of view memory D may be substantially reduced. Although this minimizes the bit volume stored in the field of view memory D, this approach obviously complicates the accessing of data therefrom appreciably. The first mentioned alternative is, therefore, presently preferred.

ENTRY OF DATA INTO THE FIELD OF VIEW MEMORY

The entry of data into the field of view memory D will now be described with reference to the 25-mile radar range only. Of course, the entry of data into the 50- and 100-mile radar ranges is accomplished in a substantially identical manner, and may be accomplished simultaneously with the entry of data into the 25-mile radar range, due to the elongate nature of rad heads 30 and 32, previously described, which simultaneously read the requisite data for all three radar ranges, as described hereinbefore.

Assuming that the aircraft approaches the geographic area from outside the area, read heads 30 and 32 move from the longitudinal sides of strips 20 and 21 of main memory A towards the center thereof. Each time the heads read a track, data words of that track within the aircraft field of view are written into the field of view memory D, via buffer core E. This process is continued until the field of view memory is filled with data words. Alternatively, data words corresponding to an area within the data map can be read into the field of view memory if the aircraft is initially located within the data map, e.g., if the aircraft takes off from a landing field located in the geographic area recorded on the strip.

UPDATING THE FIELD OF VIEW MEMORY

As the aircraft moves in a given direction, read heads 30 and 32 move correspondingly and continuously read the data on those data tracks which correspond to subareas that come into the aircraft radar range or field of view. This continuously newly sampled data is written into the field of view memory by adding the data from newly sampled tracks to one side of the field of view memory and deleting a corresponding number of tracks from the opposite side of the field of view memory. The aircraft field of view stored in the field of view memory D thus remains of a constant size.

This updating of the field of view memory is schematically illustrated in FIGS. 5a and 5b and 6. There, the field of view memory proper comprises the area within the square 48, which circumscribes a field of view circle 44 for the aircraft radar. As is apparent from FIG. 6, a somewhat larger square 42 encloses memory section 48. The region between memory section 48 and square 42 comprises a track margin area 46 of sufficient width to accommodate approximately 30 tracks, to enable the continuous updating of the field of view memory, as previously described.

The relative aircraft position on the field of view memory is at the memory center 54. Although various approaches to the updating of the field of view memory are possible, the presently preferred approach employs adding data words to the track margins 46 in the direction in which the aircraft is proceeding and deleting data words from track margins 46 in the opposite directions, while changing the addresses of the various tracks to coincide with the speed and heading of the aircraft. For example, the 25-mile range field of view was originally written into the field of view memory as illustrated in FIGS. 5a and 6. The aircraft location corresponds to the memory center 54, while the aircraft heading which, for example, is chosen as northwest, corresponds to the vector 55 illustrated in FIG. 5a. As the field of view memory is updated to simulate the northwest movement of the aircraft, the southmost and eastmost data words and data tracks, respectively, are deleted and replaced by new data words and tracks containing north and west data words and tracks. Specifically, as regards motion in the west direction, the eastmost track of the field of view memory is deleted, that is, moved into the track margin 46 in FIG. 6, and replaced by a new westmost track by moving a track from the opposite track margin in FIG. 6 into the field of view memory section 48. Furthermore, the aircraft location or memory center 54 must be moved over by one track in the west direction. Similarly, for north motion, the southmost words of each track are replaced by new northmost words, the aircraft location or memory center 54 being moved up in the north direction by one word length.

FIG. 5b illustrates the arrangement of the field of view after a number of such updatings, as a result of aircraft movements. As is apparent from the figure, the memory center or aircraft location 54' is now substantially displaced to the northwest. Furthermore, the aircraft heading vector 55' is now broken or contained within two regions of the field of view memory 48, since the new north and west data has been entered into the region of the field of view memory formerly occupied by east and south data. Of course, by suitable address changes, the data may be readily accessed out, notwithstanding the fact that physically the data is contained in two regions of the field of view memory.

By updating the field of view memory in this manner, only those new data words coming within the field of view of the aircraft need be entered, as opposed to reentering all of the data words, so that the entry of data may be accomplished in the requisite short time to permit effective radar simulation. Thus, the field of view memory D will be continuously updated in accordance with the data words coming into the field of view of the simulated aircraft.

ACCESSING THE DATA FROM THE FIELD OF VIEW MEMORY

Accessing of the data words in the field of view memory sections is accomplished with a read head for each memory track. The read heads are disposed over the drum or disc, which rotates beneath the heads and thus accesses the data in each memory section once during each revolution. Greater data accessing rates can be obtained by increasing the rate of rotation of the drum or disc or, if that is not practicable, by doubling or tripling the number of read heads for each track to thus access each memory section 120 or 180 times, respectively, per second, if the drum rotates at 60 revolutions per second.

Referring now to FIGS. 6 through 9, a sequencing unit F performs the transformation of the data stored in the field of view memory from cartesian to a polar coordinate arrangement. The sequencing unit F is a complex gating pattern generator including a read-only-memory which instructs the unit as to which data word groups are to be accessed during a particular revolution of the field of view memory drum by opening the applicable read gates.

The read-only-memory is programmed to address a group of data points in the field of view memory D which make up a group of several polar scan lines on the final radar display. The read-only-memory divides the possible addresses into a multiplicity of scan line groups, for example, 300 to 400 scan lines. During actual readout from the field of view memory D, the aircraft flight simulator C causes the read-only-memory to select those scan line groups which make up the radar scan sector for a given aircraft heading. As the heading changes, the selected scan line groups change correspondingly while straight line travel of the aircraft results in the selection of the same scan line groups. The foregoing sector selection is graphically illustrated in FIG. 6, wherein the desired sector for a northwest aircraft heading is illustrated in solid lines 56 while the desired sector for a north heading is illustrated in dashed lines 57. Thus, as the aircraft heading changes, the sector of data words to be accessed is rotated accordingly.

FIGS. 7 and 8 graphonumerically illustrate a typical addressing of the read heads of the field of view memory D by the sequencing unit F. Assuming, for example, that the scan line group comprises the scan lines 63, 65 and 67 and the field of view memory comprises tracks A through Q, each track having data words 1 through 10, then the sequencing unit will address the data words as listed in FIG. 8 in the form of independent sets 63a, 65a and 67a for scan lines 63, 65 and 67. Thus, data words, representing the elevation and radar reflectance characteristics of the sub-areas along polar coordinates of the geographic area originating at the radar scan of the aircraft are obtained.

Sequencing unit F directs the heads of the field of view memory D as to which one of the several field of view memory sections is to be accessed as the memory rotates the sections under the heads. To this end, the sequencing is coupled with the radar range switch.

As hereinbefore described, the sequencing unit F directs the heads of the field of view memory D to read along discrete polar coordinate lines which are equally angularly spaced, so that the polar coordinate scan lines and the data words will not always coincide. As is apparent from FIGS. 7 and 8, the read only memory of the sequencing unit is so programmed that those data words which lie closest to a given polar scan line are selected. This, of course, results in minor inaccuracies of the data thus accessed, which is graphically depicted in FIG. 9. Specifically, FIG. 9 illustrates a scan line 70 pressing through a portion of the field of view memory 72, wherein a plurality of data words are illustrated as circles. In accordance with the present invention, those data words lying closest to scan line 70 will be accessed. Specifically, the data words to be accessed are designated by reference numeral 74.

These inaccuracies may be minimized by employing interpolation techniques between adjacent data words to approximate data values lying on the scan line. Such interpolation is illustrated in FIG. 9, wherein scan line 70 passes through a region 76 of the field of view memory. As is apparent from FIG. 9, four data words 76a, 76b, 76c and 76d are adjacent scan line 70 at this particular region, but do not lie thereon. As graphically depicted in FIG. 9, conventional interpolation techniques may be employed to derive a data value at a location 76e lying on scan line 70 from the data word 76a, 76b, 76c, and 76d. Thus, data values coinciding with the scan lines may readily be calculated to minimize the errors encountered in accessing the data in a polar coordinate arrangement.

BEAM WIDENING EFFECT

Since the data is thus accessed in a manner irrespective of the radar range, it is apparent that the resolution on the radar display obtained therefrom will be constant. In actuality, however, radar resolution decreases appreciably with range increase due to a beam widening effect whereby the radar reflectance from long distances represent the reflectance values of a relatively large area while the radar reflectance from short distances represents the radar reflectance of a small area.

Due to this beam widening effect, the appearance of objects at long range differs substantially from their appearance at short range.

To simulate this phenomena, the present invention provides for the inclusion of a beam widening effect. The manner in which this may be accomplished is illustrated in FIGS. 10 and 11. In general, a beam widening effect may be simulated by averaging the reflectance values of data points at varying azimuthal locations about the scan line, at a given range. Such averaging is graphically depicted in FIG. 10, wherein there is depicted a plurality of data points 78, 80, 82 and 84 at varying azimuthal locations with respect to a scan line 86, at a given range. Specifically, the data words closest to scan line 86, on opposite sides thereof, are designated as data words 78. With increasing azimuthal distance, there are depicted pairs of data words 80, 82 and 84, on opposite sides of scan line 86. According to the present invention, the reflectance value for scan 86 at this range is calculated to the weighted average of the reflectance values of data words 78, 80, 82 and 84. Specifically, a set of weighting factors which may be associated with these data words is graphically depicted in FIG. 10, wherein the weighting factor for the pair of data words 78 closest to scan line 86 is one and the weighting factors for the remaining data words decrease with increasing azimuthal distance from scan line 86. Specifically, the weighting factor for data words 80 is depicted as being three-quarters, the weighting factor for data words 82 is depicted as being one-half, and the weighting factor for data words 84 is depicted as being one-quarter.

Accordingly, the reflectance at a given range may be calculated in accordance with the equation $$\sum_{1}^{8} a_i x_i$$

wherein the term $a_i$ represents the various weighting factors and the term $x_i$ represents the reflectance values of the varying data words. As is apparent from FIG. 10, this weighting technique results in a stepwise approximation of the curve 88 depicted in dashed line in FIG. 10. Although beam widening, in actuality, does not take place in such increments, this approximation is permissible because of the small usable number of grey scale levels in the final radar display CRT which limits the useful limits of reflectance.

In order to accomplish the beam widening effect as hereinbefore described, the apparatus depicted in FIG. 11 may be provided. Specifically, there is depicted an integrated circuit memory G into which the data words access from the field of view memory D are entered. Of course, in order to perform beam widening as hereinbefore described, it is necessary that eight data words be accessed for each range interval, these data words being those azimuthally adjacent to the particular scan line. The eight data words for each location are respectively applied to the inputs of eight multipliers or weighting circuits 90. Multipliers 90 function to multiply the reflectance components of the data words by the appropriate weighting factors, which, as hereinbefore described, are 1, ¾, ½ and ¼, respectively, as the azimuthal distance from the scan line increases. The outputs of multipliers 90 are connected to the inputs of an eight input adder circuit 92 which functions to add the weighted reflectance values, and thus to accomplish the beam widening calculation in accordance with the equation hereinbefore stated. Typically, multipliers 90 and adder 92 may comprise integrated circuits.

DISPLAY GENERATION

Referring again to FIG. 1, the remainder of the radar simulation system according to the present invention will now be described in detail. As mentioned briefly hereinbefore, the data access from the field of view memory D is entered into an integrated circuit memory G, wherein the signals are arranged in order of successive polar scan lines and increasing range for each scan line. Assuming the field of view memory D is accessed 120 times a second, then the scan data memory must have a sufficient capacity to store the data words of approximately 10 scan lines, including sufficient capacity to permit beam widening calculation as hereinbefore described.

The data words stored in the scan data memory are separated into radar reflectance and elevation components. The thus separated data is entered into a composing register H which has a capacity equal to two scan lines of data words, so that one scan line of data words may be loaded while the preceding scan line is being transmitted. The output from the register H are thus digital approximations for the elevation and radar reflectance functions along each successive scan line in real time.

The outputs of composing register H are applied to a radar equation computer J, wherein the data may be digital to analog converted and smoothed into a continuous analog function of the elevation and radar reflection, and then processed in accordance with the conventional radar equation. Accordingly, the output of the radar equation computer J may be applied to a cathode ray tube K in order to produce a simulation of a conventional radar image of the geographic area.

While the radar simulation system according to the present invention has been described as having one display system, it is apparent that a plurality of display systems may be employed with a single main memory A. Specifically, main memory A may employ multiple sets of heads, each set of heads entering data into a different field of view memory. Thereafter, duplicate data accessing and display components may be provided to enable the use of a plurality of displays from the same main memory A. In this manner, a plurality of substantially independent radar simulation systems may be provided with a common main memory A.

While a particular embodiment of the present invention has been shown and described in detail, it is apparent that adaptations and modifications may be made without departing from the true spirit and scope of the present invention as set forth in the claims.

What is claimed is:

1. A digital radar simulation system comprising a main memory containing data words representative of the radar reflectance and elevation of an array of subareas of a geographic area, field of view memory means for accessing and storing the data words of a portion of the geographical area within the field of view of a simulated aircraft, and sequencing means for electronically accessing the data words in the field of view memory means in polar coordinate arrangement.

2. Apparatus according to claim 1 wherein said main memory comprises optically coded data storage means mounted to a movable support and optically sensitive means for scanning the storage means.

3. Apparatus according to claim 2 wherein the data words are arranged on perpendicular bits and tracks on said data storage means in cartesian coordinate format.

4. Apparatus according to claim 2 including buffer means between the optically sensitive means and the field of view memory means for the temporary storage of output signals.

5. Apparatus according to claim 1 wherein the data words are arranged in cartesian coordinate format in said field of view memory means and said field of view memory means includes updating means for entering data words corresponding to locations entering the field of view of a simulated aircraft while deleting data words corresponding to locations leaving the field of view of the simulated aircraft.

6. Apparatus according to claim 5 wherein said sequencing means comprises means for accessing the data words in a sector of the field of view memory means centered about a line corresponding to the instantaneous relative direction of the simulated aircraft, in the form of a plurality of successive radial scan lines originating from the instantaneous relative position of the simulated aircraft, the data words accessed being those adjacent the scan lines.

7. Apparatus according to claim 5 further comprising beam widening means for averaging the data words at varying azimuthal locations adjacent the scan lines to effect a blurring simulating radar beam widening.

8. A digital radar simulation system for simulating the radar display of an aircraft overflying a geographical area comprising: a high density main memory storing digital data words representing the radar reflectance and altitude of an array of equally spaced geographic sub-areas disposed in cartesian coordinates, a field of view memory for storing a plurality of said digital data words in cartesian coordinate arrangement, means for non-destructively reading the data words in a region of the main memory disposed about the instantaneous position of said aircraft and for entering these data words in the field of view memory, sequencing means for electronically accessing data words from the field of view memory lying proximate to a plurality of successive radial scan lines originating from the instantaneous relative position of the aircraft, said scan lines forming a sector centered about a line corresponding to the instantaneous relative direction of the aircraft and processing means for processing the data words from the sequencing means for display on a cathode ray tube.

9. Apparatus according to claim 8 wherein said processing means comprises separating means for separating the data words into elevation and reflectance signals, means for digital-to-analog converting said elevation and reflectance signals, and a radar equation computer responsive to the analog signals.

10. Apparatus according to claim 8 wherein said main memory comprises optically coded data storage means mounted to a movable support and optically sensitive means for scanning the storage means.

11. Apparatus according to claim 10 wherein said optically coded data storage means comprises at least one cylindrical strip mounted to a rotating drum, one of the cartesian coordinate axes being parallel to the circumference of the drum, and means for moving the optically sensitive means in the direction of the other of said axes in response to the movement of said aircraft.

12. A method of simulating the radar display of a geographic area as viewed from an aircraft comprising the steps of storing data words representative of the radar reflectance and elevation of an array of sub-areas of the geographic area, reading and temporarily storing the data words of a region of the geographic area encompassing the location of the aircraft, sequentially electronically accessing those temporarily stored data words lying proximate to a plurality of successive radial scan lines originating from the instantaneous relative position of the aircraft, said scan lines forming a sector centered about a line corresponding to the instantaneous relative direction of the aircraft and processing the sequentially accessed data words for display on a cathode ray tube.

13. The method according to claim 12 wherein the step of storing comprises storing the data words on an optically coded storage medium and the step of reading comprises rotating the optically coated storage medium adjacent an optical sensor.

14. The method according to claim 12 wherein the data words are stored in a cartesian coordinate arrangement.

15. The method according to claim 14 wherein the step of processing includes averaging the radar reflectance component of a plurality of data words proximate to the scan line at a given range to produce a beam widening effect.

16. The method according to claim 15 wherein the step of processing includes separating the radar reflectance and elevation components of the data words, digital-to-analog converting the components and computing simulated radar signals from the components in accordance with the radar equation.

17. The method according to claim 14 wherein the step of reading and temporarily storing includes periodically updating the temporarily stored data words by deleting those data words corresponding to sub-areas leaving the field of view of the aircraft and substituting therefor data words corresponding to sub-areas entering the field of view of the aircraft.

* * * * *